(12) United States Patent
Bezzek

(10) Patent No.: US 8,343,517 B1
(45) Date of Patent: Jan. 1, 2013

(54) MULTIVITAMIN-MINERAL LONGEVITY REGIMEN

(76) Inventor: Mark S. Bezzek, Mill Spring, NC (US)

( * ) Notice: Subject to any disclaimer, the term of this patent is extended or adjusted under 35 U.S.C. 154(b) by 0 days.

(21) Appl. No.: 13/043,056

(22) Filed: Mar. 8, 2011

(51) Int. Cl.
*A61K 9/00* (2006.01)

(52) U.S. Cl. ...................................... 424/400

(58) Field of Classification Search .................. None
See application file for complete search history.

(56) References Cited

U.S. PATENT DOCUMENTS

| | | | |
|---|---|---|---|
| 4,752,479 A | 6/1988 | Briggs et al. | |
| 5,494,678 A | 2/1996 | Paradissis et al. | |
| 6,326,031 B1 * | 12/2001 | Hsia et al. | 424/523 |
| 6,953,588 B2 | 10/2005 | Cooper et al. | |
| D553,734 S | 10/2007 | Chen et al. | |
| 2002/0155163 A1 | 10/2002 | Benjamin et al. | |
| 2005/0123669 A1 * | 6/2005 | Yamada | 426/614 |
| 2005/0214383 A1 | 9/2005 | Bubnis et al. | |
| 2006/0088610 A1 * | 4/2006 | Vorsa et al. | 424/732 |
| 2007/0128272 A1 | 6/2007 | Zerbe et al. | |
| 2010/0021533 A1 * | 1/2010 | Mazed et al. | 424/450 |

* cited by examiner

*Primary Examiner* — Brian Gulledge

(57) ABSTRACT

A novel dietary supplement is featured which can benefit individuals suffering from various conditions such as nutritional deficiencies, vitamin deficiencies, aging, cancer, high blood pressure, high cholesterol, coronary artery disease, and stroke.

2 Claims, No Drawings

MULTIVITAMIN-MINERAL LONGEVITY REGIMEN

BACKGROUND OF THE INVENTION

The present invention features a novel dietary supplement which can benefit individuals suffering from various conditions such as nutritional deficiencies, vitamin deficiencies, aging, cancer, high blood pressure, high cholesterol, coronary artery disease, and stroke.

The content of this patent application is presented solely for the purpose of being reviewed by the United States Patent and Trademark Office for patentability of the claimed novel dietary supplement. In accordance with the Dietary Supplement Health and Education Act of 1994 (DSHEA), Applicant asserts that statements made within this patent application have not been evaluated by the Food and Drug Administration. Further in accordance with DSHEA, Applicant asserts that the novel dietary supplement is not intended to diagnose, treat, prevent, mitigate or cure disease.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

The novel dietary supplement is referred to hereinafter as the "Formulation". In some embodiments, the Formulation comprises the following supplemental components: Pregnenolone at about 30 mg; natto kinase at about 300 mg; vitamin K2 at about 32 mg; coenzyme Q10 at about 300 mg; acetyl L-carnitine arginate at about 700 mg; L-glutathione at about 250 mg; vitamin A (as beta-carotene at about 25000 iu, palmitate at about 2500 iu); vitamin C (as ascorbic acid and ascorbyl palmitate) at about 2000 mg; vitamin D3 (as cholecalciferol) at about 8000 iu; vitamin E (mixed tocotrienols gamma/delta) at about 1000 mg; thiamine B1 at about 50 mg; riboflavin B2 at about 200 mg; niacinamide at about 1000 mg; vitamin B6 (as pyridoxine hydrochloride/pyridoxol 5-phosphate coenymated) at about 200 mg; folate (as folic acid and calcium folinate) at about 1 mg; vitamin B12 (methyl cobalamin) at about 2000 mcg; biotin at about 6 mg; pantothenic acid (as calcium d-panthothenate and panthethine) at about 500 mg; calcium (as calcium carbonate, malate, amino acid cholate or citrate) at about 1000 mg; iodine (as potassium iodine) at about 220 mcg; magnesium (as magnesium amino acid chelate) 1000 mg; zinc (as monomethionine plus zinc citrate) at about 40 mg; silenium (as l-selenomethionine plus sodium selenite) at about 200 mg; copper (as copper sebacate) at about 2.5 mg; manganese (as manganese citrate) at about 5 mg; chromium (chromium poylynicotinate/histidinate) at about 1200 mcg; molybdenum (as molybdenum amino acid chelate) at about 2000 mcg; sodium at about 5 mg; potassium at about 50 mg; aged garlic at about 1000 mg; N-acetyl cysteine at about 600 mg; vacadyl sulphate at about 400 mg; silymarin (milk thistle extract) at about 600 mg; D-ribose at about 10 grams; indole 3 carbinol at about 200 mg; sulphoramane 225 mg at about 225 mg; cranberry (vaccinium macrocarpon) at about 1000 mg; pycnogenol at about 250 mg; l-glutathione at about 250 mg; cinnamomum root at about 4000 mg; choline (as bitartrate) at about 1000 mg; inositol at about 1000 mg; apha-lipoic acid and r lipoic acid at about 600 mg; polygonum cuspidatum root extract at about 1000 mg (standardized to 53% trans-reservatrol; dimethylaminoethanol (dmae) (as bitartrate) at about 30 mg; grape seed extract at about 300 mg; methylsufonylmethane (msm) at about 250 mg; hawthorn berry extract at about 1500 mg; N-acetyl tyrosine at about 25 mg; turmeric extract (rhizome) (95% curcumin) 8 gms; green tea extract (95% pomphenols, solution epogalocatequina galato (egcg)); ginko leaf extract (50:1) (25% flavonglylosides) at about 140 mg; bilberry extracts (25% anthocyanins) at about 600 mg; rutin at about 100 mg; blain pepper fruit extract (bioperine) 3 mg; lycopene at about 110 mg; boron (as amino acid chelate) at about 12 mg; lutein at about 20 mg; astaxanthin at about 20 mg; bitter mellon at about 1000 mg; dehydroepiandrosterone (dhea) at about 2000 mg; black currant seed at about 2000 mg; carnosine at about 3 gms; conjugated linoeic acid (cla) at about 3000 mg; and hyaluronic acid at about 80 mg.

In some embodiments less than 10 of any supplemental components are removed from the Formulation. In some emnbodiments, less than 5 of any supplemental components are removed from the Formulation.

In some embodiments, the Formulation is administered to a human patient once a day. In some embodiments, the Formulation is administered to a human patient once a week.

The Formulation may be a solid tablet, granule, syrup or liquid form. One of ordinary skill would be able to prepare an appropriate form of the Formulation.

The unit "mcg", for example iodine (as potassium iodine) at about 220 mcg, means micrograms.

The ratio of 50:1 recited above, for example ginko leaf extract (50:1) means 50 parts of the extract to 1 part of water.

As used herein, the term "about" refers to plus or minus 10% of the referenced number. For example, the administration of uridine 5 monophosphate at "about 100 mg" means that uridine 5 monophosphate can be administered at 90 mg up to 110 mg.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A formulation comprising the following supplemental components:
   (i) pregnenolone at about 30 mg;
   (ii) natto kinase at about 300 mg;
   (iii) vitamin K2 at about 32 mg;
   (iv) coenzyme Q10 at about 300 mg;
   (v) acetyl L-carnitine arginate at about 700 mg;
   (vi) L-glutathione at about 250 mg;
   (vii) vitamin A
   (viii) vitamin C at about 2000 mg;
   (ix) vitamin D3 at about 8000 iu;
   (x) vitamin E at about 1000 mg;
   (xi) thiamine B1 at about 50 mg;
   (xii) riboflavin B2 at about 200 mg;
   (xiii) niacinamide at about 1000 mg;
   (xiv) vitamin B6 at about 200 mg;
   (xv) folate at about 1 mg;

(xvi) vitamin B12 at about 2000 mcg;
(xvii) biotin at about 6 mg;
(xviii) pantothenic acid at about 500 mg;
(xix) calcium at about 1000 mg,
(xx) iodine at about 220 mcg
(xxi) magnesium 1000 mg;
(xxii) zinc at about 40 mg;
(xxiii) selenium at about 200 mg;
(xxiv) copper at about 2.5 mg;
(xxv) manganese at about 5 mg;
(xxvi) chromium at about 1200 mcg;
(xxvii) molybdenum at about 2000 mcg;
(xxviii) sodium at about 5 mg;
(xxix) potassium at about 50 mg;
(xxx) aged garlic at about 1000 mg;
(xxxi) N-acetyl cysteine at about 600 mg;
(xxxii) vanadyl sulfate at about 400 mg;
(xxxiii) silymarin at about 600 mg;
(xxxiv) D-ribose at about 10 gms
(xxxv) indole 3 carbinol at about 200 mg;
(xxxvi) sulphoramane at about 225 mg;
(xxxvii) cranberry vaccinium macrocarpon at about 1000 mg;
(xxxviii) French maritime pine bark extract at about 250 mg;
(xxxix) l-glutathione at about 250 mg;
(xl) cinnamonium root at about 4000 mg;
(xli) choline at about 1000 mg;
(xlii) inositol at about 1000 mg;
(xliii) alpha-lipoic acid and r lipoic acid at about 600 mg;
(xliv) polygonum cuspidatum root extract at about 1000 mg
(xlv) dimethylaminoethanol at about 30 mg;
(xlvi) grape seed extract at about 300 mg;
(xlvii) methylsulfonylmethane at about 250 mg;
(xlviii) hawthorn berry extract at about 1500 mg; (xlix) N-acetyl tyrosine at about 25 mg;
(l) turmeric extract 8 gms;
(li) green tea extract
(lii) ginko leaf extract at about 140 mg;
(liii) bilberry extracts at about 600 mg;
(liv) rutin at about 100 mg;
(lv) blain pepper fruit extract 3 mg;
(lvi) lycopene at about 110 mg;
(lvii) boron at about 12 mg;
(lviii) lutein at about 20 mg;
(lix) astaxarithin at about 20 mg;
(lx) bitter melon at about 1000 mg;
(lxi) dehydroepiandrosterone at about 2000 mg;
(lxii) black currant seed at about 2000 mg;
(lxiii) carnosine at about 3 gms;
(lxiv) conjugated linoleic acid at about 3000 mg; and
(lxv) hyaluronic acid at about 80 mg.

2. An anti-dementia regimen comprising administering once a day to a human the formulation of claim 1.

* * * * *